Dec. 9, 1958 R. E. SCHULZE 2,863,559
AUTOMATIC SERVICE UNIT FOR SOFTENING AND CONDITIONING WATER
Filed Dec. 13, 1955 2 Sheets-Sheet 2
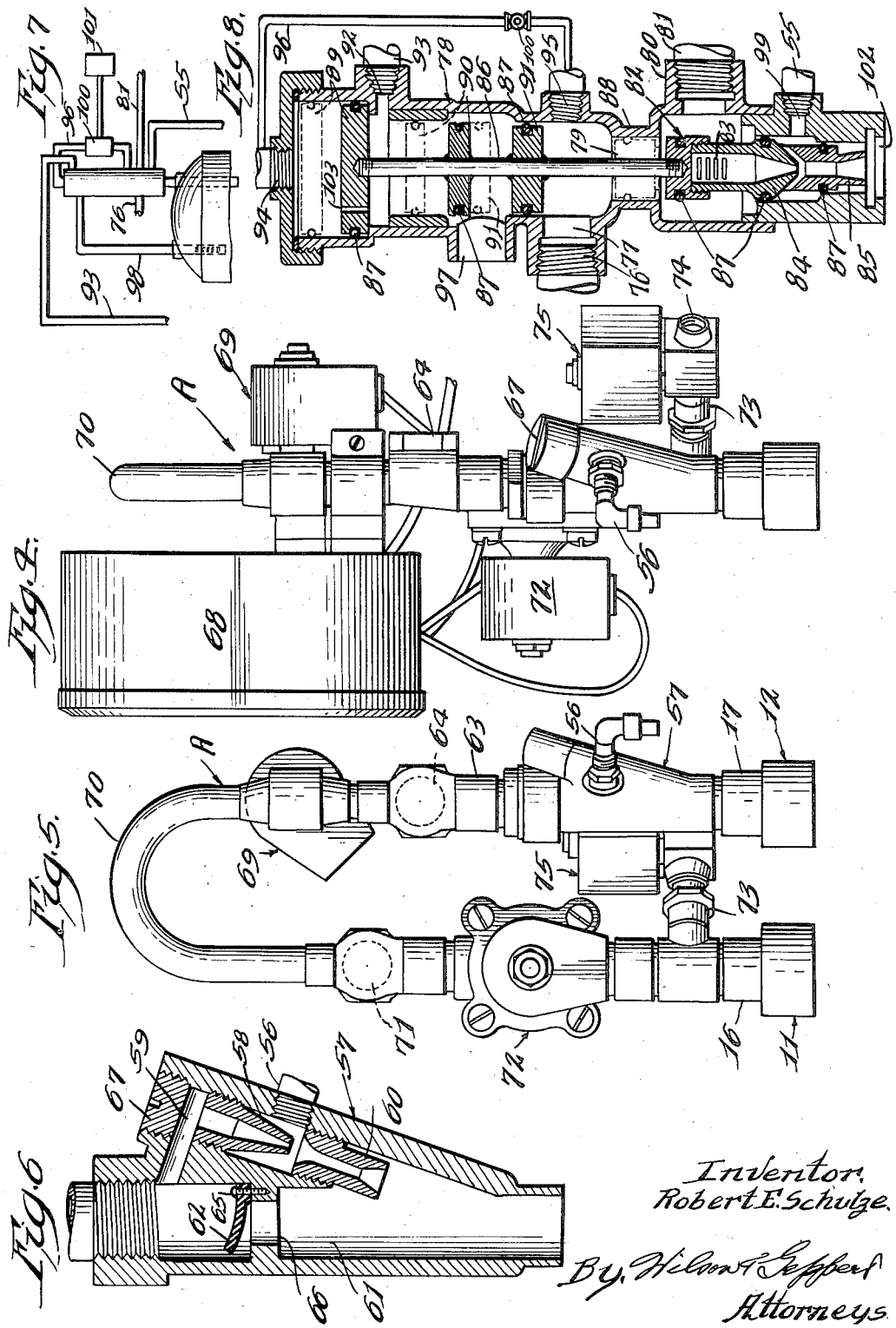
Inventor,
Robert E. Schulze.
By Wilson & Geppert
Attorneys

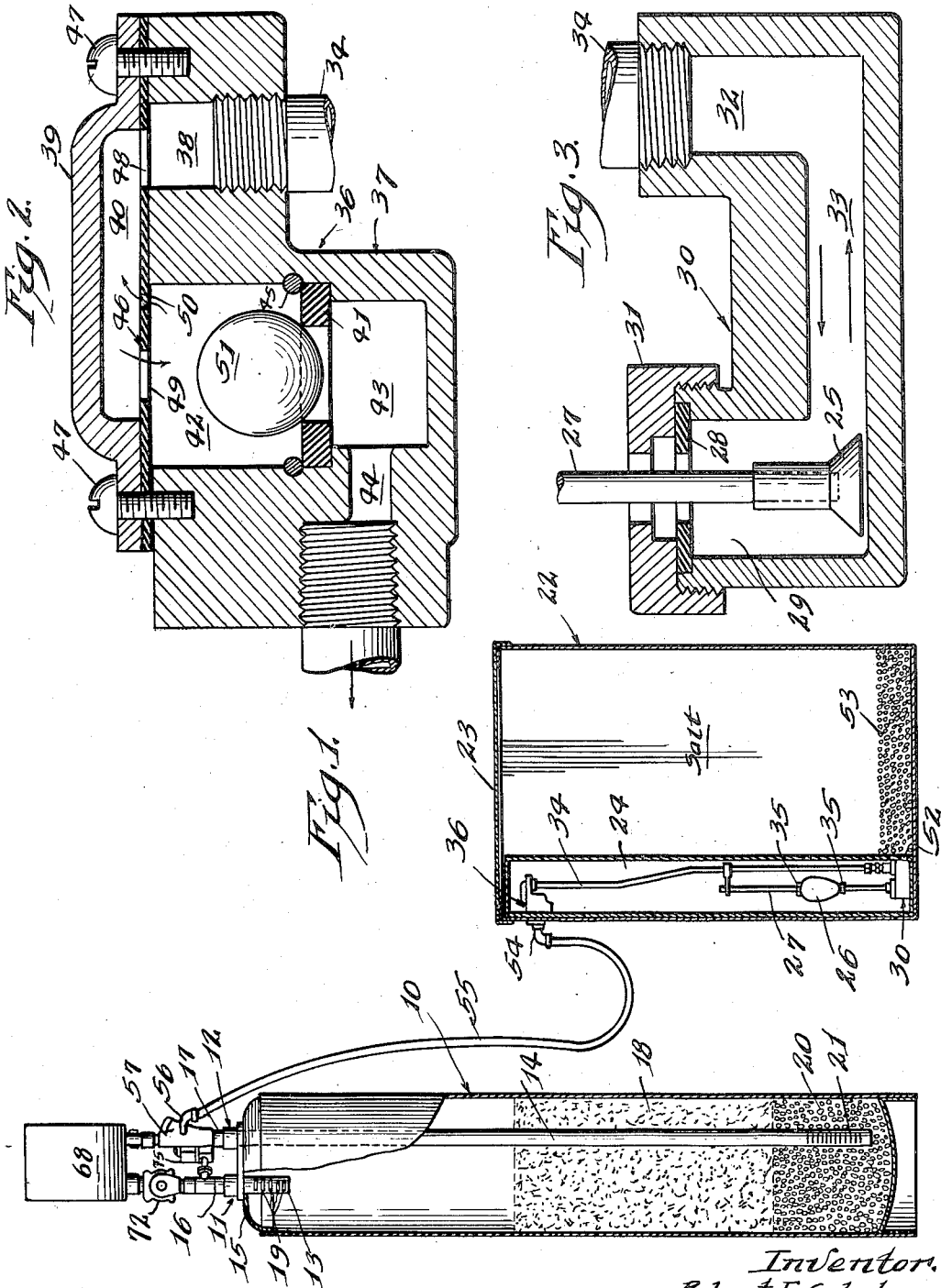

United States Patent Office 2,863,559
Patented Dec. 9, 1958

2,863,559

AUTOMATIC SERVICE UNIT FOR SOFTENING AND CONDITIONING WATER

Robert E. Schulze, Deerfield, Ill., assignor to Culligan, Inc., Northbrook, Ill., a corporation of Delaware Application December 13, 1955, Serial No. 552,845

2 Claims. (Cl. 210—126)

The present invention relates to a novel water conditioning system and to a novel means for and manner of automatically servicing or regenerating the ion exchange materials in a service type tank in the home without requiring any effort or attention of the home owner, and periodically removing this tank from the home for more complete servicing and replacing it with another similar tank in which the minerals are active or regenerated. This replacement is automatically regenerated in the home until such time as it too requires replacement when another similar tank is substituted therefor by the dealer or service man.

Soft water service for the softening, filtering and conditioning of water is now in extensive use by Culligan, Inc. throughout the United States. This service consists basically of supplying the home owner with a tank containing ion exchange material through which the entering raw or untreated water flows and is softened, filtered and conditioned, and exchanging this tank, when the minerals or ion exchange materials become spent or exhausted and require regeneration, with a similar service tank in which the minerals have been regenerated. When installed in homes, these tanks are retained for predetermined periods, generally every two or four weeks depending upon the quantity of water that is treated within the exchange period, and then the substantially exhausted tank is replaced and another similar tank containing active or regenerated exchange materials is substituted therefor. The regenerated tank is installed and the spent or exhausted tank removed, on a service charge basis.

This type of soft water service was inaugurated about 1937 and requires that the service dealers who exchange the tanks and regenerate the minerals with equipment available at their establishments must employ men to deliver and exchange each exhausted or spent tank with a tank containing active or regenerated minerals at the designated intervals. Since this service was inaugurated, labor costs have risen some 500 to 600%, requiring a subtaintial increase in the cost of this type of service.

In accordance with the present invention, there is provided a service arrangement whereby the tank containing the active ingredients need be removed only once or twice a year for complete servicing by the service operator at his establishment where he is equipped for complete regeneration, sterilization, replacement or addition to the bed of minerals in the tank, and whereby a substantial saving is effected both by the home owner and by the service operator. This manner of service operation not only greatly reduces the labor and expense for exchange of the tank when required, but permits the service operator to substantially reduce his service charge for maintenance of the service, including a substantial reduction in the number of service or replacement tanks he is required to have available or in stock for supplying to the home owners on a service basis.

In addition to a very substantial reduction in the labor cost, the automatic regeneration of the active ingredients in the home and without removal of the tank very appreciably reduces the cost of service plant operation and in his truck requirements for exchange of the tanks. During these infrequent visits to exchange tanks, the service operator supplies the home with the regenerant or salt supply for the regeneration of the active ingredients or ion exchange materials.

Regeneration in the home between these infrequent exchanges of the tank is automatically accomplished by the novel apparatus and system employed. Such regeneration is automatically initiated and effected at a designated or set time when no service is required in the home, such as late at night or early in the morning, and requires no attention of or effort on the part of the home owner for it is timer controlled and may be accomplished every night or as often as required to supply the householder's needs.

The present invention thus comprehends a novel means and manner or method of home regeneration of a service type water conditioning unit having interchangeable tanks for most effectively and cheaply supplying and maintaining at a relatively high efficiency level the treated water supply.

Another important object of the present invention is the provision of a novel water conditioning system for a home or the like including an interchangeable tank containing water conditioning minerals or materials, such as ion exchange resin or zeolite requiring periodic regeneration to maintain the desired efficiency of the unit, and time-controlled means for the automatic regeneration of the minerals without attention of the home owner.

As such regeneraion cycle is automatically initiated and controlled so that the presence of the householder is not required, the timer may be set for any period of the day or night when service is not required. As the requirement for regeneration is generally dependent upon the quantity of water treated or consumed, the regeneration in the home may be accomplished as often as each day so that a very substantial quantity of soft or treated water is produced at very little expense to the householder.

A further important object of the present invention is the provision of a novel system, apparatus for and method of automatic regeneration of a water conditioning unit in the home at frequent intervals and when not in use, and the infrequent removal of the water conditioning unit or tank from the home for periodic professional servicing including complete regeneration, sterilization and removal or replacement of the minerals as required for most effective water conditioning.

In the drawing:

Figure 1 is a view, part in side elevation and part in vertical cross section, through a water conditioning system and apparatus embodying the present invention and capable of carrying out the novel method of operation and regeneration.

Fig. 2 is an enlarged view in vertical cross section through the air check located in the upper end of the float chamber of the brine tank.

Fig. 3 is an enlarged view in vertical cross section through the brine float valve in the bottom of the float chamber of the brine tank.

Fig. 4 is an enlarged view in side elevation of the control assembly for the water conditioning system and apparatus.

Fig. 5 is a view in front elevation of the control assembly of Fig. 4, but with the timer housing and unit removed.

Fig. 6 is an enlarged view in vertical cross section through the eductor housing and unit of Figs. 4 and 5.

Fig. 7 is a fragmentary and diagrammatic view in front elevation of an alternate form of control assembly for the novel water conditioning system and apparatus.

Fig. 8 is an enlarged view in vertical cross section through the automatic valve unit for the control assembly of Fig. 7, and showing the valve in position for regeneration.

Referring more particularly to the disclosure in the drawings and to the novel illustrative embodiment shown therein, in Figs. 1 to 6, inclusive, the tank 10 is preferably of the service type contemplated in the Culligan Patent No. 2,252,065, of August 12, 1941, and provided with suitable coupling members and fittings 11 and 12, the member 11 having a depending inlet tube or manifold 13 and the member 12 having a depending outlet tube or manifold 14, and with the fitting of each threaded in a tapped opening in the head 15 of the tank. In addition, the inlet manifold is readily removed by sliding it out of its fitting.

Each coupling member is provided with a slip connector of the type shown in Culligan Patent No. 2,265,268 of December 9, 1941, for quickly connecting the coupling members 11 and 12 on the tank to complementary coupling members on the depending T's or connections 16 and 17, respectively, whereby the tank may be quickly attached, removed or replaced in the home, when desired.

The inlet tube or manifold 13 depends into the upper portion of the tank but terminates or is spaced a substantial distance above the bed of minerals 18 therein, and is thereat provided with relatively wide slots 19, while the outlet tube or manifold 14 projects downwardly through the bed of minerals 18 and into a gravel or filter bed 20 in the bottom of the tank 10, where this depending outlet tube or manifold is provided at its lower end with a finely slotted strainer section 21 to permit the passage of water but filter out the particles of gravel or minerals in the bed. These minerals may be ion exchange materials of the resinous exchange or siliceous type which during water softening or ion exchange operations tend to become inactivated by ion exchange resulting in a reduction in the quality of the effluent. Where the quality of the effluent reaches a point where it is no longer suitable for the purpose intended, the minerals have reached the point of exhaustion and require reactivation or regeneration.

In the present invention, it is intended that the minerals be regenerated or reactivated at frequent intervals, such as at a predetermined period each day when soft, treated or conditioned water is not required in the home. This may be late at night or early in the morning when the family is asleep, at which time the regeneration or reactivation is automatically accomplished by time control mechanism which automatically initiates the steps of backwashing, brining and rinsing of the regenerated materials, and returning the system to service operation.

To accomplish regeneration, the novel system comprehends a brine tank 22 constructed of a corrosion resistant material and provided with a cover 23 for access to the interior of the tank. The interior of the tank is divided to provide a vertically arranged float chamber 24 having a float valve 25 in the lower portion of this float chamber and a vertically movable float 26 for controlling this valve.

As disclosed in Figs. 1 and 3, the float valve 25 is mounted at the lower end of a float rod 27 and is lifted to closed position in contact with an annular valve seat or sealing member 28 anchored in fixed position in a port 29 of a valve housing 30 by a threaded cap nut 31. The valve housing 30 is also provided with a port 32 connected to the port 29 through a passage 33, with the port 32 connected to one end of conduit or tube 34 providing both a filling tube for water entering the brine tank 22 and a brine tube for supplying brine or regenerant from the brine tank to the service tank 10 during regeneration. Rubber positioners 35 at the opposite ends of the float 26 are adjustable on the float rod 27 to increase or decrease the amount of brine for regeneration by controlling the quantity of water delivered to the brine tank for dissolving salt.

The conduit or tube 34 is connected at its upper end to an air check valve 36 (Figs. 1 and 2) that is provided in the brine line to prevent air from being drawn into the tank 10 after the brine ceases to flow. This air check valve is located in the upper portion of the float chamber 24 and includes a housing 37 having a port 38 to which is connected the upper end of the conduit or tube 34, a cap or closure 39 having a passage 40 connecting the port 38 to the hollow interior of the housing 37 divided by a valve seat 41 into upper and lower connected chambers 42 and 43, the latter leading to a port 44. The valve seat 41 is held in place by a detachable retainer ring 45. A gasket 46 is provided between the cap or closure 39 and the body of the housing 37 with the cap or closure retaining the gasket in place and by bolts or other fastening means 47 securing the cap upon the housing. This gasket has an opening 48 between the passage 40 and the port 38 and other openings 49 and 50, the opening 49 adapted to be closed by a buoyant ball valve 51 when in elevated position. This ball valve closes the opening in the valve seat 41 when in its lowered position as shown in full lines in Fig. 2, and when elevated by the entering water flowing to the brine tank 22, closes the larger opening 49 of the gasket, thus limiting flow through the smaller opening 50.

The float chamber 24 is provided with a passage 52 adjacent its lower end connecting the lower end of the brine tank 22 to the float chamber 24. In this lower portion of the brine tank is preferably provided a bed of gravel 53 through which the salt brine is filtered. The upper portion of the brine tank 22 is of substantial capacity and capable of storing a large quantity of dry, bulk salt and sterilizing agent sufficient to supply the regenerant or brine needs for a period of six months to a year, or preferably for the entire period in which the minerals 18 in the water treating tank 10 are automatically regenerated in the home.

The port 44 of the air check valve 36 is connected at 54 to one end of a brine tube 55 with the other end of this tube connected at 56 to the side of an eductor housing 57 (Figs. 4, 5 and 6). In this eductor housing is provided an ejector nozzle 58 opening from a passage 59, and an ejector throat 60 through which flows the entering brine from the brine tube 55 during regeneration. As is well-known in the art, the eductor by creating a suction draws the brine into the eductor housing. At its lower end the eductor housing opens into the connector 17 of the outlet coupling 12 and is provided with a longitudinal passage or bore 61 having a rubber check valve 62 held open during service operation by the flow of softened and conditioned water upwardly through the passage 61, then through the nipple 63 and outwardly through the port 64 to service. This check valve is anchored at one end at 65 and is adapted to project across and close a throat 66 in the passage 61 during regeneration. A removable plug 67 permits access to the detachable ejector nozzle 58 and ejector throat 60.

The eductor housing 57 is a part of an automatic control assembly A for automatic servicing of the disclosed water conditioning system, the assembly including an automatic timer within a housing 68 for actuating, among others, a solenoid valve 69 controlling passage through the U-bend tubing 70. At one end of this tubing is located an inlet 71 for the raw or untreated water which in service operation flows downwardly through a passage controlled by a solenoid valve 72 into the inlet coupling or fitting 16 of the automatic control assembly connected to the inlet fitting 11 of the tank 10. A connector 73 connects the inlet fitting 16 through the drain outlet 74 to drain through a solenoid valve 75.

In the automatic control assembly A of Figs. 1 to 6, inclusive, the valve 72 is open and the valves 69 and 75 are closed when the system is in service operation, at which time the raw or untreated water enters the inlet 71 and flows downwardly through the connection 16, inlet manifold 13, downwardly through the bed of minerals 18, upwardly through the outlet manifold 14, connection 17 and through the bore or passage 61 and outlet port 64 for the softened or conditioned water to service.

At a predetermined setting of the timer 68, valve 72 is closed and valves 69 and 75 are opened to effect regeneration. Brine is drawn from the float chamber 24 of the brine tank 22 and through the port in the valve seat 41, through the brine tube 55 into the outlet manifold 14 of the softener tank 10 by suction created by the eductor in the eductor housing 57, and flows upwardly on in an upflow direction through the bed of minerals 18 in a direction reverse to that of normal flow of the water during service operation. With the valve 72 closed, the entering raw water is prevented from entering the inlet manifold 13, but is by-passed through the U-bend tubing 70 and flows downwardly into the eductor housing 57. With the check valve 62 closed, the entering water flows through the passage 59, ejector nozzle 58 and ejector throat 60 and draws the brine from the tube 55 into the eductor housing 57. The brine flowing upwardly through the bed of minerals, then exits through the normal inlet manifold 13, fitting 11 and connection 16 and through the connector 73, valve 75 and drain outlet 74 to drain.

As the brine is drawn by suction created by the eductor through the housing 37 of the air check valve 36, the buoyant ball 51 remains unseated from its valve seat 41 as the distance from the gasket 46 to the valve seat 41 is sufficient so that the upward force caused by the buoyancy of the ball 51 is greater than the downward suction force so that the ball does not seat.

When all the brine has been withdrawn from the brine tank 22, air flows through the brine tube 55 into the air check valve 36 until the brine is completely out of the valve 36 and the ball 51 seats and stops the air flow. However, water continues to flow downwardly through the eductor housing 57, passage 59, through the ejector nozzle 58 and ejector throat 60, and downwardly through the outlet manifold 14 and upflow through the minerals 18 to rinse the salt from the unit. When rinsing has been accomplished and at the end of the rinse period, the timer opens valve 72 and closes valves 69 and 75 whereupon the unit returns to service operation.

While untreated or tap water contains a few parts per million of dissolved air, by virtue of its being dissolved it does not affect the regeneration process. The present check valve is provided to prevent large bubbles of undissolved air from being drawn into the bed of ion exchanger and cause air agitation or turbulence sufficient to lift the ion exchanger to the proximity of the inlet manifold where it could be lost.

As soon as the valves 69, 72 and 75 have been actuated for return to service operation, softened and conditioned water flows out of the eductor housing 57, through the connection or elbow 56 and the brine tube 55 into the brine tank 22 through the opening 50 in the gasket 46 only until the level of the water reaches the float 26 causing the brine valve 25 to lift and close and seal against the valve seat 28 to shut off the flow of water to the brine tank. The float 26 also controls the quantity of brine that is drawn from the brine tank 22 into the softener unit, with the rubber positioners 35 capable of being moved up or down to increase or decrease the quantity of brine delivered.

It is to be understood that during regeneration with the valve 72 closed and the valves 69 and 75 opened, raw or untreated water is available in the home with this water entering the inlet 71, passing through the U-bent tubing 70 and out through the service outlet port 64.

In the alternate embodiment of an automatic control assembly B as shown in Figs. 7 and 8, raw or untreated water enters through the inlet pipe 76 connected to the port 77 of the valve unit 78. Fig. 8 shows this valve unit in its regenerating position in which the entering raw or untreated water passes downwardly through the then open throat or bore 79 of the valve unit to the by-pass for the raw or untreated water and the outlet 80 connected to the service line 81 for normally supplying the home with softened or conditioned water. The raw or untreated water during regeneration also enters the eductor 82 through the plural slots of a strainer section 83, downwardly through an ejector nozzle 84 and an ejector throat 85 into the connection to the outlet manifold 12.

The eductor is mounted upon the lower end of the stem 86 of the valve unit 78 with the eductor provided with three spaced O-rings or sealing elements 87 shown in sealing engagement with the cylindrical bore of the valve housing 88. Also mounted on the valve stem 86 are spaced spools 89, 90 and 91, with each provided with an O-ring or sealing element 87 for sealing contact with the adjacent bore of the valve housing 88.

The valve housing 88 has in addition to the inlet port 77 for the raw or untreated water and the outlet port 80 for the treated water which also provides a by-pass for supplying the untreated water to the service line 81 during regeneration, a port 92 connected to a pipe 93 for carrying away waste brine and rinse water, a port 94 and a port 95 connected by a tubing 96, a port 97 connected by a pipe or tubing 98 to the inlet manifold 11 of the tank 10 for directing the incoming raw or untreated water to the tank during normal service operation, and a port 99 connected to the brine tube 55. A solenoid-type pilot valve 100 actuated by an automatic timer 101, is provided in the tubing 96 and actuates the valve.

The valve unit 78 is a two-position valve in which the spools 89, 90 and 91, their O-rings 87 and the eductor 82 are all carried by the valve stem 86. In its service position and with the parts carried by the stem located in the dotted line position shown in Fig. 8, the raw or untreated water enters the inlet port 77 connected to the raw or untreated water supply line 76, passes upwardly and outwardly through the port 97 connected to the inlet tube 98 and inlet manifold 13 of the tank 10, down through the bed of minerals 18 (Fig. 1). The treated water then enters the slotted strainer 21 of the outlet tube or manifold 14, passes upwardly through the outlet tube and outwardly through the port 102 at the lower end of the valve housing 88 about the elevated eductor assembly 82 and into the service line 81.

When the bed of minerals 18 is automatically regenerated in the home, the timer 101 actuates the pilot valve 100 to move the two-position automatic valve unit 78 to its second or other position shown in full lines in Fig. 8, in which the raw or untreated water entering the inlet port 77 passes downwardly through the throat 79, through the ejector nozzle 84 and ejector throat 85. Brine is caused by this eductor to enter through the port 99 from the brine tube 55, and the water and brine flow downwardly through the outlet tube or manifold 14 and outwardly through its strainer section 21, upwardly through the bed of partially exhausted minerals 18, outwardly through the slots 19 in the inlet manifold 13 and into the inlet tube 16 from where it passes into the port 97 of housing 88 of the valve unit 78, upwardly about the spool 90 and outwardly through the drain port 92 and the waste pipe 93 to drain.

This flow of untreated or raw water and brine flowing in a reverse direction through the bed of minerals from that during service operation functions both to backwash and simultaneously regenerate the minerals, and upon completion of the backwashing and brining to rinse brine from the unit. As the water for the combination step of backwashing and brining and the subsequent step of rinsing flows through the ejector nozzle 84, it is limited thereby to the flow rate of the nozzle. The low flow rate for upflow backwash is sufficient to remove collected turbidity and agglomerated filtered-out insolubles which are lighter than the ion exchanger, but not sufficient to prevent loss of the latter, and brining is maintained to obtain and assure good capacity by having an appreciable long contact time of the brine with the bed of minerals to be reactivated or regenerated.

When backwashing and brining has been completed, rinse water flows through the minerals in an up-flow path to drain in the same manner as the brine. As the flow rate through the ejector nozzle combines during brining with the brine from the tube 55, it will be seen that the flow rate for the rinse water which occurs after the brine is shut off, is slightly less than the flow rate during the combined step of backwashing and brining.

During the combined step of backwashing and brining and the subsequent step of rinsing, the valve unit 78 is in the lowered, full line position in Fig. 8. The valve unit is actuated to this lowered position by operation of the pilot valve 100 permitting water to flow through the port 95 and tubing 96 into the port 94 above the spool 89 and thereby depressing this spool and the valve stem 86 with its spools 90 and 91 and the eductor unit 82 to their lowered position. The spool 89 is provided with a relief hole 103 for facilitating its operation. After rinsing has been completed, the timer 101 initiates its pilot valve 100 to actuate the automatic valve 78 and thereby stop the flow through tubing 96 into the chamber above the spool 89 and, as pressure is relieved through the hole 103, the valve is returned to service operation in which the raw or untreated water is again treated or conditioned.

In operation, dry salt is poured directly into the brine tank 22 on top of the gravel. Water is introduced into the brine tank through the tube 55, the water flowing through the passage 52 at the bottom of the float chamber 24 and upflow through the gravel into the salt. The quantity of water supplied is controlled by the float 26 which permits the water to rise only to the position of the float level at which level it is automatically shut off, whereby only the lower portion of the salt storage in the tank becomes saturated.

The timers 68 (Figs. 1 and 4) and 101 (Fig. 7), are commercially available timers that provide for setting the number of days per week that the automatic unit or assembly A or B regenerates and the hour of the day when regeneration commences and, in addition, has settings for controlling the length of time that regeneration takes place.

To control the flow rate through the eductor during regeneration where different water pressures occur, provision is made for replacement of the eductor nozzle when necessary. This is readily accomplished by providing the eductor with a removable plug 67 for ready access, removal and replacement of the nozzle. Thus the flow rate may be controlled where water pressures are constant but different for different localities or areas of the country.

When the tank requires professional servicing such as complete regeneration only available in the establishment of the service operator, including most effective backwashing, sterilization and the checking of the mineral supply to ascertain its condition and quantity so that additional minerals may be added where required, the tank 10 is exchanged by the service operator for another and similar tank in which the minerals have been completely regenerated or reactivated. At the same time, the service operator fills the brine tank 22 with dry or bulk salt sufficient to regenerate the tank 10 in the home for a period of six months or a year or more, depending upon the quantity of raw water to be treated or conditioned and the period the tank remains in the home.

Having thus disclosed the invention, I claim:

1. In apparatus for conditioning raw or untreated water and supplying it to a service line for use, a portable and readily removable service tank containing a bed of minerals through which the untreated water is directed and which minerals require periodic regeneration, said service tank having an inlet manifold for the untreated water and an outlet manifold for the discharge of the treated water, said inlet manifold having relatively wide slots for free passage therethrough of the entering untreated water into the tank during service operation and for the free passage therethrough of turbidity and agglomerated, filtered-out insolubles during backwashing, a brine tank having a chamber for receiving a supply of dry, bulk salt sufficient to repeatedly regenerate the minerals of the service tank and over a long period of time, a chamber in the brine tank for salt, a float chamber in said brine tank, a float-actuated valve in said float chamber for controlling the quantity of water fed to the brine tank for dissolving salt therein, a valve unit having multiple ports one of which is connected to the untreated water supply and another to the service connection for supplying the treated water to the service line for use, other ports in said valve unit one of which is connected to the brine in the float chamber, a port connected to drain and ports connected to the inlet and outlet manifolds of the service tank, a conduit connecting the float chamber to said valve unit providing both a filling tube for water entering the brine tank and a brine tube for supplying brine from the brine tank to the service tank during regeneration, and an air check valve for said conduit for stopping the flow of air through said conduit into said service tank when the brine has been withdrawn from the brine tank and thereby prevent turbulence and air agitation of the contents of the tank, timing means and a pilot valve actuated by said timing means for operating said valve unit for regeneration of said minerals at a designated time period.

2. Apparatus for conditioning raw or untreated water and supplying it to a service line for use and for automatically regenerating the apparatus in situ at a designated period of the day when conditioned water is normally not required, comprising a portable and readily removable and replaceable service tank containing a bed of minerals through which the untreated water is directed and which minerals require periodic regeneration, said service tank having an inlet for the untreated water and an outlet for the discharge of the treated water, a brine tank provided with a salt chamber for containing a quantity of salt sufficient for daily regeneration of the bed of minerals and over a long period of time, a valved chamber connected to the salt chamber for receiving and supplying to the salt chamber a predetermined quantity of water for dissolving salt therein, automatically-operated time control mechanism for directing the raw or untreated water through the inlet and downwardly through the bed of minerals and upwardly through the outlet during normal service operation, and at a predetermined period of the day regenerating the bed of minerals by directing water and brine through the bed of minerals in a reverse direction of flow for backwashing and regeneration and then directing water for subsequent rinsing, a conduit connecting said valved chamber to said control mechanism and service tank and providing both a filling tube for water entering the brine tank and a brine tube for supplying brine from the brine tank to the service tank during regeneration, an air check valve for said conduit for stopping the flow of air through said conduit into said service tank when the brine has been withdrawn from the brine tank and thereby prevent turbulence and air agitation of the contents of the service tank, and a manifold for said tank inlet provided with relatively large openings for the free passage and removal therethrough during backwashing of turbidity and agglomerated, filtered-out insolubles collected in the bed of minerals during service operation.

References Cited in the file of this patent

UNITED STATES PATENTS

| | | |
|---|---|---|
| 2,252,065 | Culligan | Aug. 12, 1941 |
| 2,370,190 | Ralston | Feb. 27, 1945 |
| 2,545,425 | Fischer | Mar. 13, 1951 |
| 2,751,347 | Miller | June 19, 1956 |